(12) United States Patent
Springer

(10) Patent No.: US 12,262,140 B2
(45) Date of Patent: *Mar. 25, 2025

(54) COMPOSITING CONTENT FROM MULTIPLE USERS OF A CONFERENCE

(71) Applicant: Zoom Communications, Inc., San Jose, CA (US)

(72) Inventor: Shane Paul Springer, Oregon City, OR (US)

(73) Assignee: Zoom Communications, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/333,993

(22) Filed: Jun. 13, 2023

(65) Prior Publication Data

US 2023/0328200 A1 Oct. 12, 2023

Related U.S. Application Data

(63) Continuation of application No. 17/163,442, filed on Jan. 30, 2021, now Pat. No. 11,743,417.

(51) Int. Cl.
*H04N 5/272* (2006.01)
*G06T 11/60* (2006.01)
*H04N 7/15* (2006.01)

(52) U.S. Cl.
CPC ............ *H04N 5/272* (2013.01); *G06T 11/60* (2013.01); *H04N 7/15* (2013.01); *G06T 2207/20212* (2013.01); *G06T 2207/20221* (2013.01)

(58) Field of Classification Search
CPC . H04N 5/272; H04N 7/15; G06T 2207/20212
See application file for complete search history.

(56) References Cited

U.S. PATENT DOCUMENTS

| 2016/0072862 | A1 | 3/2016 | Bader-Natal et al. |
| 2017/0039867 | A1* | 2/2017 | Fieldman ................. G09B 7/00 |
| 2019/0260966 | A1 | 8/2019 | Leatherman, III |
| 2021/0192852 | A1* | 6/2021 | Holmes ................... G06F 3/048 |

OTHER PUBLICATIONS

International Search Report in PCT International Application No. PCT/US2021/064241, mailed Jun. 1, 2022.

* cited by examiner

*Primary Examiner* — Amal S Zenati
(74) *Attorney, Agent, or Firm* — Young Basile Hanlon & MacFarlane, P.C.

(57) ABSTRACT

A first composite video depicting a media background shared by a first user of the users is transmitted for display at devices of users of a conference. A presentation content is received from a device of a second user of the users. A second composite video depicting the media background partially overlaid by the presentation content is transmitted to at least a subset of the devices for display at the at least the subset of the devices. A request may be received from a device of the first user to grant an access right to the second user to share the presentation content for depiction within the second composite video.

20 Claims, 10 Drawing Sheets

COMPOSITING CONTENT FROM MULTIPLE USERS OF A CONFERENCE

CROSS REFERENCE TO RELATED APPLICATIONS

This application is a continuation of U.S. patent application Ser. No. 17/163,442, filed Jan. 30, 2021, the entire disclosure of which is incorporated herein by reference.

FIELD OF INVENTION

The present invention relates generally to digital communication, and more particularly, to systems and methods providing for the presentation of composite video with live annotation within a video communication platform.

BACKGROUND

One of the most exciting technological breakthroughs in recent decades has involved the ability of a group of people to meet remotely within a virtual conference room or meetup room, with one or more of the participants sharing video which is streamed in real time. Within the context of online education, for example, classes can be held remotely between an instructor and several students, at least some of whom are physically and geographically separated from the teacher and/or one another. Within a so-called "hybrid classroom" environment, the teacher may teach before a classroom of near-end students who are physically located in the same classroom as the instructor, while a number of far-end students watches and participates remotely.

The instructor typically has a setup wherein video of the instructor is generated and transmitted to far-end students within a virtual classroom that is hosted on a video communication platform. In some cases, the instructor may have a conventional whiteboard (or blackboard) behind her, as is typical within physical classrooms. The instructor writes on this whiteboard as a teaching tool. In some cases, the setup involves two cameras: one trained on the instructor's face, and the other trained on the whiteboard. The video transmitted to the far-end students can thus be switched automatically and/or manually between the two different views, depending on context.

There are significant drawbacks to these approaches. In the case of a setup where one video shows both the instructor and the whiteboard, the instructor must turn her back to the students in order to write on the whiteboard. Also, while standing or pacing in front of the whiteboard, the instructor can sometimes obscure the writing with her physical presence. In the case of a setup with two cameras trained on the instructor and the whiteboard, instructors have found it difficult to share the whiteboard meaningfully in addition to the instructor's own video. Using the whiteboard hides the instructor's face, and conversely, showing the instructor's face hides the whiteboard. This leads to far-end participants having limited instruction. Prior solutions which cater to the far-end students have unfortunately been so technologically intensive, including requiring expensive specialized hardware, that they limit instruction for near-end participants in a hybrid classroom.

Thus, there is a need in the field of digital communication to create a new and useful system and method for presenting composite video with live annotation within a video communication platform. The source of the problem, as discovered by the inventors, is a lack of ability for a video presenter to live annotate over the video of themselves presenting, or over other presentations or materials, without needing to switch away from the view of the presenter's face, and without needing specialized hardware for the task.

SUMMARY

The invention overcomes the existing problems by allowing any presenter with a device that allows audio and video inputs and outputs to leverage annotation tools to draw or otherwise annotate over a live or recorded presentation or similar video which is displayed on the device. In this way, presenters can produce live content by combining live performance or instruction with written content. In a hybrid classroom, for example, this can cater to both near-end and far-end students. In non-hybrid classrooms, students can benefit from the approach whether they are near-end or far-end students.

Generally speaking, the approach includes generating a media background, which can be used to present materials (such as, e.g., presentation slides) and/or eliminate visual distractions behind the presenter. The presenter is then seen on video during the presentation. An annotation layer above the video self-view allows for the presenter to deliver written presentations in conjunction with their own video presentations. In some use cases, this combination of visual elements can be reproduced both locally for near-end participants, as well as remotely for far-end participants, thus democratizing the instructional experience. In some use cases, a presenter may present while one or more participants watching may be able to annotate over the presenter's view.

One embodiment relates to a method for providing a composite video for live annotation. First, the system receives video content depicting imagery of a first user, with the video content having multiple video frames. The system then determines a boundary about the first user in the video frames, with the boundary having an interior portion and an exterior portion. The system provides a media background for the exterior portion, then generates a composite video for display on client devices, with the composite video depicting the media background in a first layer and the first user in a second layer. The system then receives one or more annotation inputs corresponding to the composite video. The annotation inputs can include media-based and/or messaging-based annotations. Finally, the system updates the composite video to additionally depict the annotation inputs within a third layer.

In some embodiments, the video content in question may be, e.g., a live video stream or broadcast, pre-recorded video, any other suitable form of video, or a combination thereof. In some embodiments, the first user can appear as facing forward in the video content, with the media background behind the user and with annotations appearing overlaid in front of the first user in the composite video. In some embodiments, the media background can be provided to a second user, and annotation inputs can be received from the second user that correspond to the media background and which consist of graphical and/or textual annotations.

In some embodiments, generating the composite video is performed in real time or substantially real time upon receiving the annotation inputs. In some embodiments, at least one of the annotation inputs is a touch-based input. In some embodiments, the media background is transparent or semi-transparent. In some embodiments, the system can receive one or more repositioning or resizing inputs corresponding to the video content, and in response to these inputs, reposition or resize the video content while the imagery of the first user appears overlaid on the media background.

In some embodiments, the system receives a selection of one or more additional pieces of video content to be included in the composite video. The system then updates the composite video to depict the additional pieces of video content within one or more layers of the composite video. In some embodiments, at least one of the additional pieces of video content depicts imagery of an additional user, material presented by an additional user, or a combination thereof. In some embodiments, the selection is received from either the first user or one of the additional users.

In some embodiments, the system periodically or continuously detects a network bandwidth of each of the client devices associated with the additional users, and dynamically adjusts the video quality of at least one layer of the composite video displayed on at least one of the client devices in real time or substantially real time based on the detected network bandwidth of the client devices.

In some embodiments, the system sends one or more reports from the additional users to the first user of one or more elements of the composite video being displayed with inferior video quality. The system receives a request from the first user to adjust the video quality of one or more elements of the composite video, and then adjusts, in real time or substantially real time, the video quality of the one or more elements of the composite video based on the request from the first user.

In some embodiments, the system receives from a client device associated with one of the additional users, a request to remove the imagery of the first user from the composite video. The system then re-generates, in real time or substantially real time, the composite video for display such that the imagery of the first user within the second layer is removed and the media background and annotation inputs within the first layer and third layer remain. In some embodiments, the system receives a selection to replace the imagery of the first user within the second layer of the composite video with imagery of one or more additional users, then re-generates the composite video in real time or substantially real time, such that the imagery of the first user within second layer is replaced with the imagery of the one or more additional users.

In some embodiments, the video content is received from one or more video cameras connected to a client device associated with the first user, and/or one or more of the client devices associated with the additional users. Alternately, the video content can be received from a remote repository. In some embodiments, the first user and additional users are users of a video communication platform, and are connected remotely within a virtual video communication room generated by the video communication platform.

One embodiment relates to a method. The method includes transmitting, for display at devices of users of a conference, a first composite video depicting a media background shared to the conference by a first user of the users; receiving a presentation content from a device of a second user of the users; and transmitting for display a second composite video depicting the media background partially overlaid by the presentation content to at least a subset of the devices.

Another embodiment relates to a system that includes a memory and a processor. The processor is configured to execute instructions stored in the memory to transmit for display at devices of users of a conference a first composite video depicting a media background shared by a first user of the users; receive a presentation content from a device of a second user of the users; and transmit for display a second composite video depicting the media background partially overlaid by the presentation content to at least a subset of the devices.

Another embodiment relates to a non-transitory computer readable medium that stores instructions operable to cause one or more processors to perform operations. The operations include transmitting for display at devices of users of a conference a first composite video depicting a media background shared to the conference by a first user of the users; receiving a presentation content from a device of a second user of the users; and transmitting for display a second composite video depicting the media background partially overlaid by the presentation content to at least a subset of the devices.

Further areas of applicability of the present disclosure will become apparent from the detailed description, the claims and the drawings. The detailed description and specific examples are intended for illustration only and are not intended to limit the scope of the disclosure.

BRIEF DESCRIPTION OF THE DRAWINGS

The present invention relates generally to digital communication, and more particularly, to systems and methods providing for containment of sensitive data within a communication or messaging platform.

The present disclosure will become better understood from the detailed description and the drawings, wherein.

DETAILED DESCRIPTION

Figure 1A:
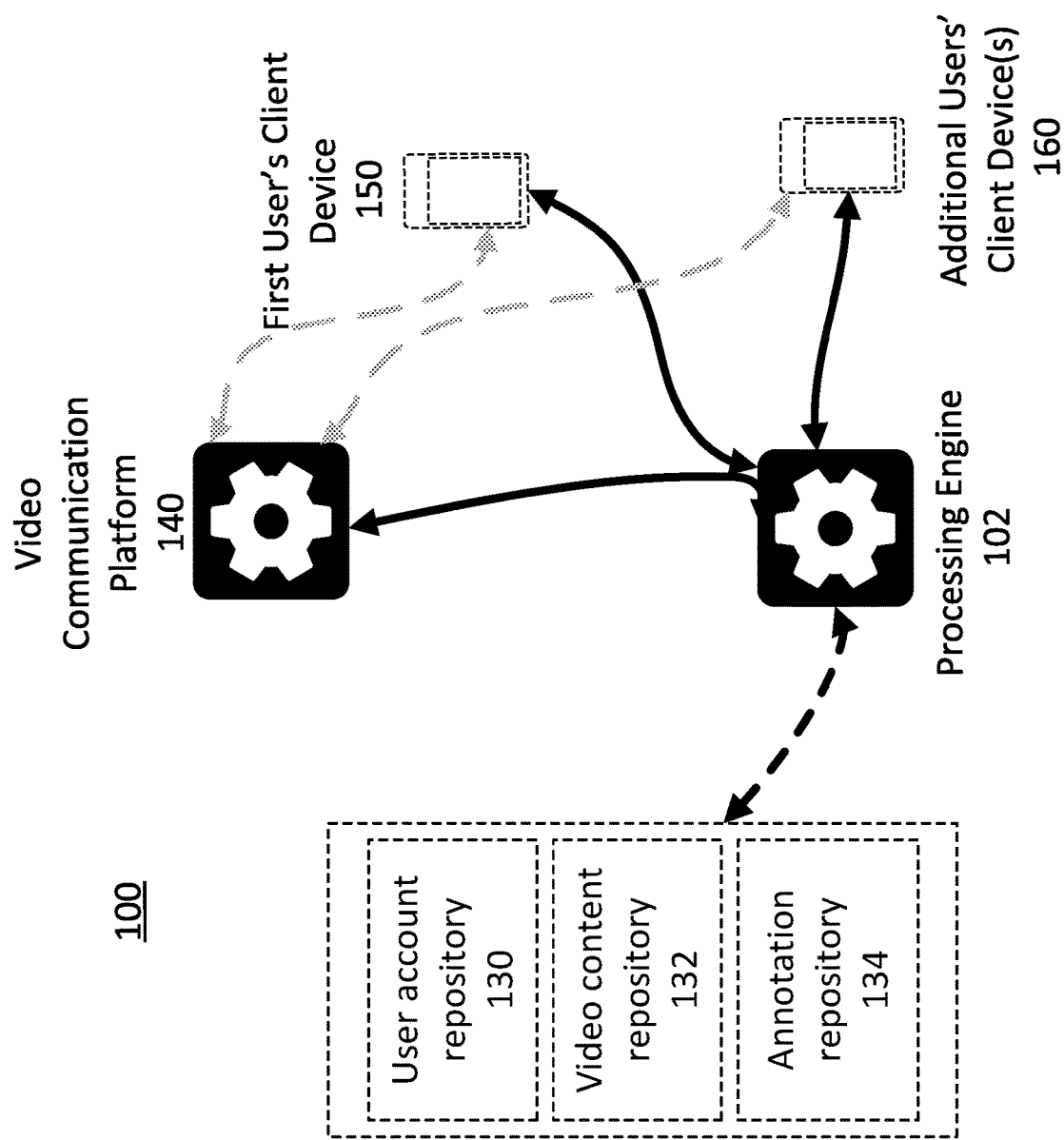
FIG. 1A is a diagram illustrating an exemplary environment in which some embodiments may operate.

In this specification, reference is made in detail to specific embodiments of the invention. Some of the embodiments or their aspects are illustrated in the drawings.

For clarity in explanation, the invention has been described with reference to specific embodiments, however it should be understood that the invention is not limited to the described embodiments. On the contrary, the invention covers alternatives, modifications, and equivalents as may be included within its scope as defined by any patent claims. The following embodiments of the invention are set forth without any loss of generality to, and without imposing limitations on, the claimed invention. In the following description, specific details are set forth in order to provide a thorough understanding of the present invention. The present invention may be practiced without some or all of these specific details. In addition, well known features may not have been described in detail to avoid unnecessarily obscuring the invention.

In addition, it should be understood that steps of the exemplary methods set forth in this exemplary patent can be performed in different orders than the order presented in this specification. Furthermore, some steps of the exemplary methods may be performed in parallel rather than being performed sequentially. Also, the steps of the exemplary methods may be performed in a network environment in which some steps are performed by different computers in the networked environment.

Some embodiments are implemented by a computer system. A computer system may include a processor, a memory, and a non-transitory computer-readable medium. The memory and non-transitory medium may store instructions for performing methods and steps described herein.

By way of illustration, a teacher in a remote learning classroom may wish to introduce materials including a whiteboard and a presentation document into her lecture. The teacher receives a setup from the school administration with one camera trained on her face and another camera trained on the whiteboard. She also receives a tablet computer where she can toggle between the two camera views manually, as well as switch to a third view sharing the presentation slides. The teacher is able to incorporate the view of herself, the view of the whiteboard, and the shared screen with the presentation slides on it, but not in a seamless way. All three different views must necessarily overlap each other. If the teacher's face is within the fame, it will take up a square-sized space that was otherwise reserved for the view of the whiteboard or presentation slide. The whiteboard and the presentation slide must also compete for visual space on the screen. Since the whiteboard and the presentation slides are two separate screens, the teacher is also unable to annotate the presentation slides, or provide annotation over the view of herself.

In contrast, using the current approach, a simpler setup would provide improved results. The teacher's administration instead provides a setup of a single camera trained on the teacher's face, and a tablet computer which shares the presentation slides. Rather than a second camera and a physical whiteboard, the teacher's tablet computer can be used to allow the teacher to provide live annotations over both the image of the teacher and the presentation slides. The presentation slides are used as a media background, and a boundary is determined about the imagery of the teacher from the video feed, thus creating an image mask for the teacher's frame. The teacher's image is then overlaid on top of the presentation as media background, with the teacher's previous background from the video is removed and replaced with a portion of the presentation background, such that the teacher appears seamlessly overlaid on top of the current presentation slide. The teacher's tablet screen displays a self-view of the video of the teacher, which can be toggled to a display of the current presentation slide. In both case, the teacher can select an "annotate" element which is presented on the video communication platform's interface, begin drawing on the tablet screen using touch input, and the annotations will appear both on the teacher's tablet screen and on the shared screen visible to the students. Thus, rather than use a separate whiteboard as a teaching implement, the teacher can draw directly over the self-view and/or the presentation slide view, illustrating points and marking up sections of the slide in real time.

Optionally, the teacher can allow one or more students from the class to present for a period of time. The student is given permission by the teacher to share his screen containing the student's presentation. The teacher may ask questions or provide feedback during the presentation, and during this, she can annotate on the student's presentation slide to point to sections she has questions about or wishes to provide feedback on. During this, the teacher's view may still appear on the screen, overlaid on top of the student's presentation, or alternately, the student's video may replace the teacher's, and a new image mask of the student is determined for being overlaid on top of the background.

Many other possibilities and options can be contemplated for this use case and others, as will be described in further detail throughout.

I. Exemplary Environments

FIG. 1A is a diagram illustrating an exemplary environment in which some embodiments may operate. In the exemplary environment 100, a first user's client device 150 and one or more additional users' client device(s) 160 are connected to a processing engine 102 and, optionally, a video communication platform 140. The processing engine 102 is connected to the video communication platform 140, and optionally connected to one or more repositories and/or databases, including a user account repository 130, video content repository 132, and/or an annotation repository 134. One or more of the databases may be combined or split into multiple databases. The first user's client device 150 and additional users' client device(s) 160 in this environment may be computers, and the video communication platform server 140 and processing engine 102 may be applications or software hosted on a computer or multiple computers which are communicatively coupled via remote server or locally.

The exemplary environment 100 is illustrated with only one additional user's client device, one processing engine, and one video communication platform, though in practice there may be more or fewer additional users' client devices, processing engines, and/or video communication platforms. In some embodiments, one or more of the first user's client device, additional users' client devices, processing engine, and/or video communication platform may be part of the same computer or device.

In an embodiment, the processing engine 102 may perform the method 200 (FIG. 2A) or other method herein and, as a result, provide composite video with live annotations within a video communication platform. In some embodiments, this may be accomplished via communication with the first user's client device, additional users' client device (s), processing engine, video communication platform, and/ or other device(s) over a network between the device(s) and an application server or some other network server. In some embodiments, the processing engine 102 is an application, browser extension, or other piece of software hosted on a computer or similar device, or is itself a computer or similar device configured to host an application, browser extension, or other piece of software to perform some of the methods and embodiments herein.

The first user's client device 150 and additional users' client device(s) 160 are devices with a display configured to present information to a user of the device. In some embodiments, the first user's client device 150 and additional users' client device(s) 160 present information in the form of a user interface (UI) with UI elements or components. In some embodiments, the first user's client device 150 and additional users' client device(s) 160 send and receive signals and/or information to the processing engine 102 and/or video communication platform 140. The first user's client device 150 is configured to perform functions related to presenting and playing back video, audio, documents, annotations, and other materials within a video presentation (e.g., a virtual class, lecture, webinar, or any other suitable video presentation) on a video communication platform. The additional users' client device(s) 160 are configured to viewing the video presentation, and in some cases, presenting material and/or video as well. In some embodiments, first user's client device 150 and/or additional users' client device(s) 160 include an embedded or connected camera which is capable of generating and transmitting video content in real time or substantially real time. For example, one or more of the client devices may be smartphones with built-in cameras, and the smartphone operating software or applications may provide the ability to broadcast live streams based on the video generated by the built-in cameras. In some embodiments, the first user's client device 150 and additional users' client device(s) are computing devices capable of hosting and executing one or more applications or other programs capable of sending and/or receiving information. In some embodiments, the first user's client device 150 and/or additional users' client device(s) 160 may be a computer desktop or laptop, mobile phone, virtual assistant, virtual reality or augmented reality device, wearable, or any other suitable device capable of sending and receiving information. In some embodiments, the processing engine 102 and/or video communication platform 140 may be hosted in whole or in part as an application or web service executed on the first user's client device 150 and/or additional users' client device(s) 160. In some embodiments, one or more of the video communication platform 140, processing engine 102, and first user's client device 150 or additional users' client devices 160 may be the same device. In some embodiments, the first user's client device 150 is associated with a first user account on the video communication platform, and the additional users' client device(s) 160 are associated with additional user account(s) on the video communication platform.

In some embodiments, optional repositories can include one or more of a user account repository 130, video content repository 132, and/or annotation repository 134. The optional repositories function to store and/or maintain, respectively, user account information associated with the video communication platform 140, video content received by the video communication platform 140 for display within video presentations, and annotations, which may include media and/or messaging-based annotations. The optional database(s) may also store and/or maintain any other suitable information for the processing engine 102 or video communication platform 140 to perform elements of the methods and systems herein. In some embodiments, the optional database(s) can be queried by one or more components of system 100 (e.g., by the processing engine 102), and specific stored data in the database(s) can be retrieved.

Video communication platform 140 is a platform configured to facilitate video presentations and/or communication between two or more parties, such as within a video conference or virtual classroom.

Figure 1B:
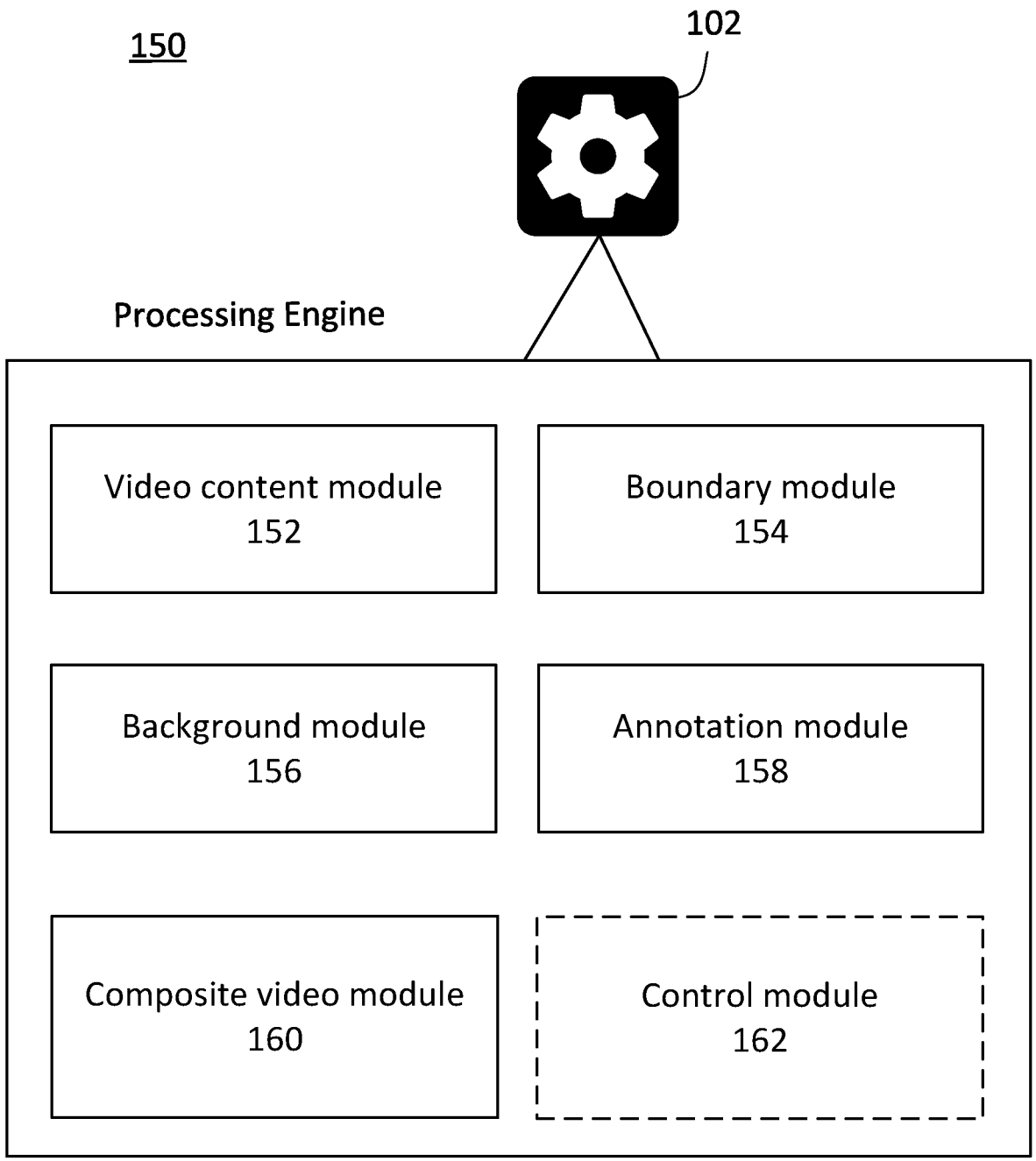
FIG. 1B is a diagram illustrating an exemplary computer system that may execute instructions to perform some of the methods herein.

FIG. 1B is a diagram illustrating an exemplary computer system 150 with software modules that may execute some of the functionality described herein.

Video content module 152 functions to receive video content depicting imagery of a first user, with the video content having multiple frames.

Boundary module 154 functions to determine a boundary about the first user in the video frames of the video content, with the boundary having an interior portion and an exterior portion.

Background module 156 functions to provide a media background for the exterior portion of the boundary.

Annotation module 158 functions to receive one or more annotation inputs corresponding to the composite video, with the annotation inputs being media-based and/or messaging-based.

Composite video module 160 functions to generate a composite video for display on one or more client devices associated with additional users. The composite video may depict the media background within a first layer, the first user within a second layer, and/or the annotation inputs within a third layer.

The above modules and their functions will be described in further detail in relation to an exemplary method below.

II. Exemplary Method

Figure 2A:
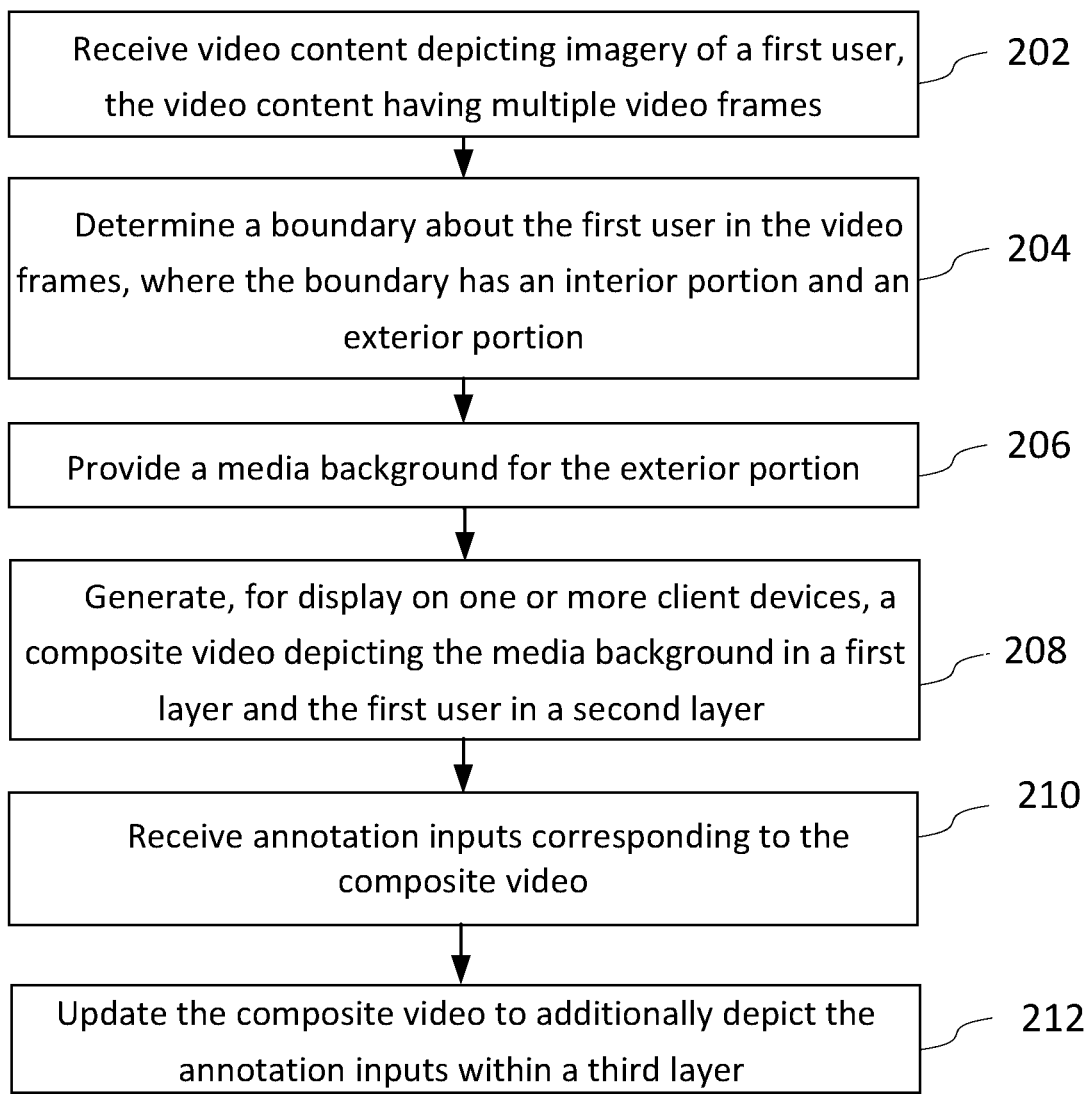
FIG. 2A is a flow chart illustrating an exemplary method 200 that may be performed in some embodiments.

FIG. 2A is a flow chart illustrating an exemplary method that may be performed in some embodiments.

At step 202, the system receives video content depicting imagery of a first user, the video content having multiple video frames. In some embodiments, the video content is generated via an external device, such as, e.g., a video camera or a smartphone with a built-in video camera, and then the video content is transmitted to the system. In some embodiments, the video content is generated within the system, such as on the first user's client device. For example, a user may be using her smartphone to record video of herself giving a lecture. The video can be generated on the smartphone and then transmitted to the processing system, a local or remote repository, or some other location. In some embodiments, the video content is pre-recorded and is retrieved from a local or remote repository. In various embodiments, the video content can be streaming or broadcasted content, pre-recorded video content, or any other suitable form of video content. The video content has multiple video frames, each of which may be individually or collectively processed by the processing engine of the system.

In some embodiments, the video content is received from one or more video cameras connected to a client device associated with the first user and/or one or more client devices associated with the additional users. Thus, for example, rather than using a camera built into the client device, an external camera can be used which transmits video to the client device.

In some embodiments, the first user and any additional users are users of a video communication platform, and are connected remotely within a virtual video communication room generated by the video communication platform. This virtual video communication room may be, e.g., a virtual classroom or lecture hall, a group room, a breakout room for subgroups of a larger group, or any other suitable video communication room which can be presented within a video communication platform.

At step 204, the system determines a boundary about the first user in the video frames, where the boundary has an interior portion and an exterior portion. In some embodiments, determining the boundary may partially or fully involve "image masking" techniques and/or backdrop removal techniques, whereby an image is separated from its background. Each of the video frames is a still image depicting the first user. The outline of the first user is detected by the system and used as the boundary about the first user. The boundary has an interior portion, consisting of everything inside of the boundary or outline of the first user; and an exterior portion, consisting of everything outside of the boundary or outline of the first user. In some embodiments, the interior portion and exterior portion of the boundary each constitute layers which are separated into different images for each video frame. In various embodiments, image masking techniques used may include, e.g., layer masking, clipping mask, alpha channel masking, or any other suitable image masking techniques. In some embodiments, the boundary is updated each time the user moves, i.e., as additional video frames are received, such that the user moving around in the frame of the video leads to the boundary being updated.

At step 206, the system provides a media background for the exterior portion of the boundary. The media background may consist of any media or documents which can be accessed in a video communications platform, such as e.g., video, audio, text, presentation documents consisting of a number of slides, or a game or other interactive interface or component. In some embodiments, the media background is received as a selection from the first user or one of the additional users from a pre-defined set of media backgrounds, or may be automatically provided as a default media background. For example, by default the media background may be a solid grey background, but a user can pick from a selection of pre-existing media backgrounds stored locally or on the cloud. In some cases, a user may download or otherwise retrieve a media background from an external source, or generate a media background themselves, then import it into the video communications platform. In some embodiments, a presentation including a number of slides may be selected as a media presentation. The presentation can depict one slide at a time in a slideshow format, with the user clicking or performing some other action to progress to the next slide. In some embodiments, the media background may be a video, such as a short movie which can be played back such that the video plays at the same time for all users participating in the video session. In some embodiments, the media background may be, e.g., a word processor document or spreadsheet document, a web site, a PDF document, or any other suitable viewable material. In some embodiments, the media background is dynamically generated in real time during the video session.

At step 208, the system generates, for display on one or more client devices associated with the first user and/or additional users, a composite video depicting the media background in a first layer and the first user in a second layer, where the second layer is overlaid on top of the first layer. The composite video functions to construct a single video out of 1) the interior portion of the boundary which depicts the first user from the video content, and 2) the media background which was provided for the exterior portion of the boundary from step 206. The media background appears behind the user. The background for the video content, which was the backdrop behind the first user in the video content, is replaced by the media background. The resulting effect is that the user appears as though he is seamlessly placed on top of the media background, with the initial backdrop of the video content not present. In some cases, the media background is much larger than the video content, and the video content appears within a sub portion of the media background.

In some embodiments, the composite video can be generated using any of a number of video compositing techniques and processes which provide for the layering of several different clips of video over one another to produce a single video. Video compositing techniques and processes may include, e.g., masking, digital image manipulation, background projection, flipping or reversing (e.g., flipping the imagery of the annotations so that the annotations are readable by viewers and do not appear reversed), deep image compositing, alpha compositing, digital matte compositing, computer vision models and algorithms, or any other suitable video compositing techniques and processes.

In some embodiments, the system generates the composite video in real time or substantially real time upon receiving the video content and providing the media background. Thus, there may be scenarios where composite video is generated and provided on the fly in the middle of a presentation. For example, in one situation, the presentation has already started and the presenter has already appeared before viewers, but without any media background. The original backdrop of the video content, e.g., the presenter's room, is still visible behind the presenter. However, the presenter may select a presentation slide for sharing from his screen, as a participant has requested to see it. In some embodiments, upon the presentation slide being provided, the system can automatically perform the steps of the present approach to generate a composite video, with the presenter appearing seamlessly in front of the presentation slide, and with the original backdrop of the presenter's view no longer being visible. This is executed nearly instantly or very soon after the presenter selects the presentation slide, such that the viewers immediately see the presentation slide with the presenter loaded in front of the slide, rather than initially seeing, e.g., just the presentation slide, just the presenter, or both side-by-side.

At step 210, the system receives one or more annotation inputs corresponding to the composite video. In some embodiments, the annotation inputs may be provided via touch or stylus input from a client device. For example, the first user may use a stylus to sketch notes on the screen of a client device which is showing the user during a live presentation. As the user sketches notes while broadcasting, the notes are received by the system. In some embodiments, annotation inputs may include, e.g., touch-based annotations, messaging-based annotations (including, e.g., emojis and other symbols), or media-based annotations (such as video, audio, documents, images, drawings, or any other suitable media).

In some embodiments, the annotation inputs are received solely from the first user who is presenting or hosting, whereas in other embodiments, the annotation inputs are received by additional users who are viewing or participating in the video. In some embodiments, at least one of the annotation inputs is received from at least one of the client devices associated with additional users viewing or participating. In this way, for example, an instructor need not be the only person who can annotate video during a virtual classroom session; the instructor may assign one or more students to have access rights to annotate the screen, which can provide additional interaction with students. Alternately, the instructor can temporarily allow a student to present before the class, including the student sharing presentation slides and annotating over the slides while the teacher watches. In some embodiments, "breakout rooms" populated by subgroups of participants may be generated, permanently or temporarily splitting the group up into divisions to collaborate or discuss in smaller groups. In some embodiments, such breakout rooms may each have a presenter who can be designated by the subgroup or by the first user, and an annotator who can be designated by the subgroup or by the first user. In some embodiments, the presenter may replace the video of the presenter with video of a selected participant, who speaks before the other participants using his or her own client device to stream the video content. The selected presenter can annotate and present. In some embodiments, the initial presenter may instead make annotations while the new presenter presents. For example, a student may be able to present their homework to the teacher, with the homework being presented as a media background, and the teacher may make annotations and markings on the homework in real time as it is being presented.

In some embodiments, the first user can assign participants of a single room into separate breakout rooms or subgroups, and each breakout room can have the same media background. In some embodiments, this media background is assigned by the first user. In some embodiments, the media background is a video or presentation in which each breakout room is configured to play back the video file in synchronization with the other breakout rooms. In some embodiments, one or more annotators in each group can be assigned by the first user or by other participants, and each breakout room has a different set of annotations from the other rooms. In other embodiments, one single user, such as the first user, can have access rights to annotate over the media background.

In some embodiments, the first user is provided with the ability to switch the view on the first user's client device to any one of the composite videos from the subgroups or any combination of a plurality of the composite videos from the subgroups. For example, a teacher may be able to jump between four different breakout rooms via the client device, watching composite videos for each, or may be able to view multiple composite videos at once from the different breakout rooms. In some embodiments, the teacher may opt to view two, three, or all four breakout rooms simultaneously, switching between an audio feed for each as desired. In some embodiments, the first user may have the ability to remove or add back one or more layers from any of the composite videos from the subgroups.

Many other such possibilities may exist for groups and rooms to have presenters, participants, annotators, and media backgrounds in various configurations.

At step 212, the system updates the composite video to additionally depict the annotation inputs within a third layer, where the third layer is overlaid on top of the second layer of the composite video. Upon receiving the annotation inputs in step 210, the system depicts the annotations as though they are overlaid in front of the user. For example, in a live stream, the user may draw on the client device directly on top of a self-view of the user, i.e., the user is watching himself present on the client device in real time. As the user draws, the annotations appear as though they are being drawn directly in front of the user. In some embodiments, the annotations may correspond to the media background, including markings of various parts of the media background. For example, a user may circle a bullet point of interest on the screen while a media background of a presentation slide is being depicted. The system updates the composite video with such annotations in real time, so that viewers and participants see the annotations as they are being sketched out.

In some embodiments, similarly, the system can update the composite video in real time or substantially real time upon receiving the one or more annotation inputs. Upon the presenter annotating the screen, the live stream can update the video available to users instantly or nearly instantly with those same annotations upon the viewable screen being broadcasted on the live stream. In this way, there is no perceptible delay between the presenter writing, sketching, drawing, or typing something onto the screen, and viewers seeing those annotations on their screens.

In some embodiments, the system will perform one or more of steps 202 through 212 periodically, semi-periodically, or continuously such that the system will keep updating the composite video to depict additional annotations as they are received, and will also keep generating composite video as video content is received. In some embodiments, this is done in real time or substantially real time.

In some embodiments, the first user and/or one or more of the additional users watching the video can be provided with the ability to render the annotation inputs as transparent or semi-transparent. The system processes and renders the annotation inputs to appear on the screen as transparent or semi-transparent, rather than the default appearance of full opacity. Such an option may allow users to view any aspects of the media background and/or presenter's image which would otherwise be obscured by the annotations. In some embodiments, the user can turn on this transparency for all users by default. In some embodiments, the additional users watching the presentation can opt to turn the transparency on or off independently of how the annotations are presented to other viewers. In some embodiments, the re-rendering of the annotations is performed and presented in real time or substantially real time upon the option being selected.

In some embodiments, the system periodically or continuously detects a network bandwidth of each of the client devices associated with the additional users. The system then dynamically adjusts the video quality of at least one of the layers of the composite video displayed on at least one of the client devices in real time or substantially real time based on the detected network bandwidth of the client devices. In various embodiments, video quality may include one or more elements such as, e.g., high-definition video, whether audio is compressed and by how much, video resolution, whether processing or filtering is applied to the video, or any other suitable settings for increasing or decreasing video quality.

For example, some participants watching the video may be using suboptimal network connections, or may be traveling somewhere while moving in and out of a signal and connection. In such circumstances, the system can dynamically adjust the quality of the video to compensate for this lowered or suboptimal network bandwidth. In some embodiments, the system may dynamically adjust one layer or two layers, rather than all three layers of the composite video. This may be performed when the system detects that not all of the layers feature content which struggles to load due to suboptimal network bandwidth. The system identifies which layers do present such problems, and lowers the video quality of just those layers, while leaving the others intact.

In some embodiments, the participants can optionally send reports about video quality to the first user, in order to share information about which elements of the composite video are being displayed on their screens with inferior video quality. The system receives a request from the first user in response to these reports, with the first user requesting to adjust the video quality of one or more elements of the composite video identified in the reports as struggling to load or presenting glitches. The system then adjusts, in real time or substantially real time upon receiving the request, the video quality of the one or more elements of the composite video which are identified in the request from the first user. In this way, users can send feedback about problem elements of a streaming presentation while the presentation is occurring, and the presenter or host can take steps to correct the issue in real time while the presentation is underway. This keeps the presentation from being presented in a suboptimal fashion for its entire duration.

In some embodiments, the first user or one of the participants (i.e., additional users) may submit a request to remove the first user from the composite video. The system then updates the composite video such that the first user within the second layer is removed, while the second layer and third layer remain. This provides the ability of a presenter or participants to remove the presenter's image, such that only the media background and annotations are visible. This may be useful in various situations, such as when the full screen is needed to see the media background, or when the presenter no longer wishes to be visible within the presentation, but prefers to present the materials by themselves with annotations.

In some embodiments, the system can receive a selection to replace the first user within the second layer of the composite video with the images or video of one or more additional users who are participating in the video. The system updates the composite video such that the imagery of the first user within the first layer is replaced with the imagery of the one or more additional users.

Figure 2B:
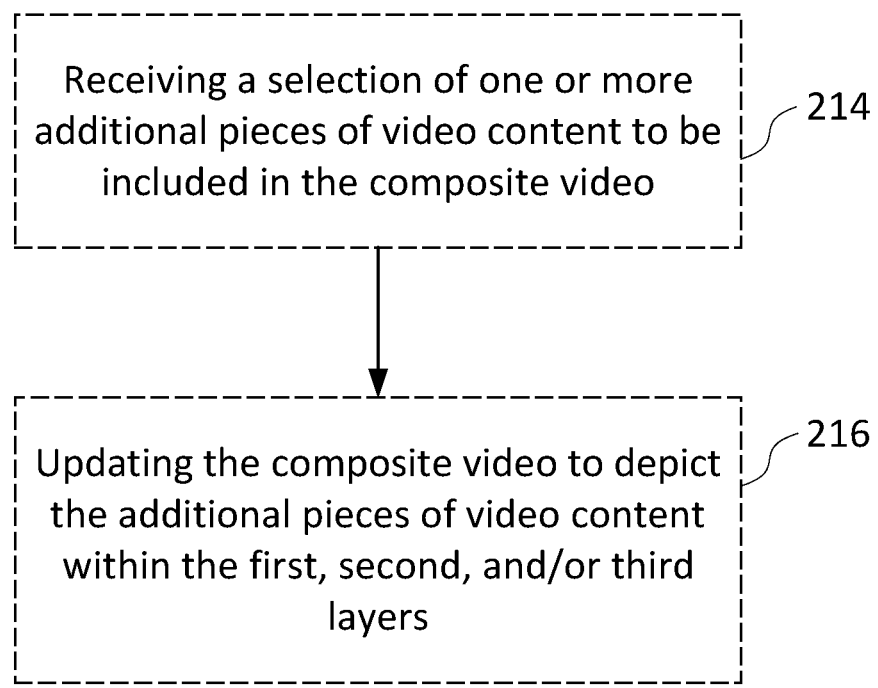
FIG. 2B is a flow chart illustrating an exemplary method 250 that may be performed in some embodiments.

FIG. 2B is a flow chart illustrating another exemplary method that may be performed in some embodiments.

At optional step 214, the system receives a selection of one or more additional pieces of video content to be included in the composite video. In some embodiments, the user and/or one or more of the participants may have the ability to add additional pieces of content to the composite video, including video content. In some embodiments, the user or participant may select the additional pieces of video from a local or remote repository, or from a pre-defined selection of video content. For example, while a user is seen overlaid over a presentation slide and is explaining the slide, the user may illustrate a point by selecting a brief video clip from a local hard drive.

In some embodiments, at least one of the additional pieces of video content depicts imagery of an additional user, material presented by an additional user, or a combination thereof. Many such possibilities may exist for participants other than the initial presenter to present their own images and video of themselves, their own media backgrounds (including, e.g., PDFs, video, interactive elements, websites, or any other suitable media backgrounds), or some combination of the two.

In some embodiments, the selection of the additional pieces of video content is received from either the first user or one of the additional users. For example, in a classroom setting, a teacher may request a group of users to present a short film they have created. In response, one of the users selects a video file from a cloud storage which contains the short film. The class can then watch the short film together while one or more of the presenting students annotates to point out different aspects of the film.

At optional step 216, the system updates the composite video to depict the additional pieces of video content within one or more layers of the composite video. In some embodiments, the system uploads and/or caches the video content before depicting it within the composite video. In some embodiments, the additional video content can appear in the first layer of the composite video, i.e., within the same layer as the media background. Thus, a portion of the media background may be obscured where the additional video content is located. In some embodiments, the user who selected the content can reposition or resize it to adjust the location and size and to ensure that it does not block any key content within the media background.

In some embodiments, the system will performs steps 214 and 216 periodically, semi-periodically, or continuously such that the system will keep updating the composite video to depict additional pieces of video content as they are received.

Figure 3:
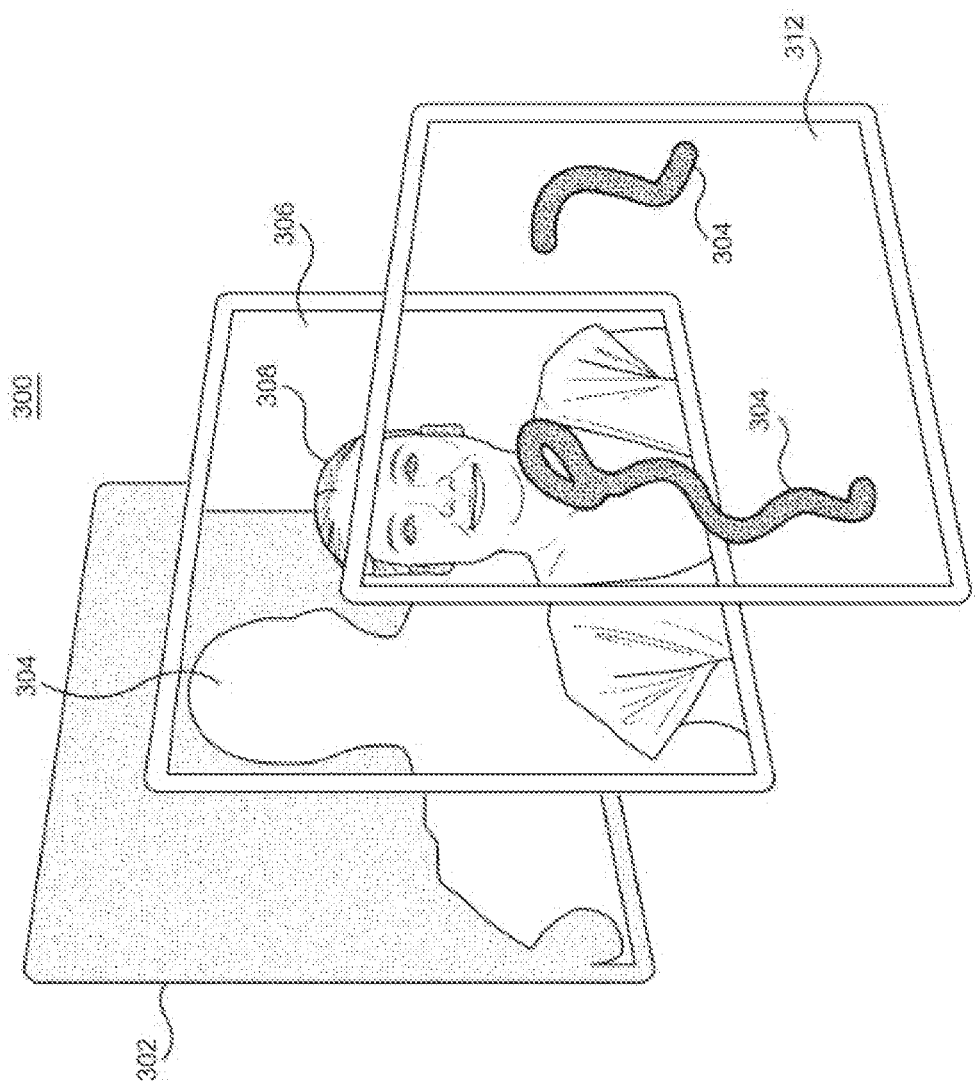
FIG. 3 is a diagram illustrating one example embodiment 300 of providing live annotations over a presenter in self-view, in accordance with some embodiments.

FIG. 3 is a diagram illustrating one example embodiment 300 of providing live annotations over a presenter in self-view, in accordance with some embodiments. As illustrated in FIG. 2A and the description above, the system receives video content depicting imagery of a first user. The system then determines a boundary about the first user in the video frames, where the boundary has an interior portion and an exterior portion. The system provides a media background for the exterior portion, and then generates a composite video depicting the media background in a first layer and the first user in a second layer, with the second layer overlaid on top of the first layer.

As illustrated in the example embodiment 300, a composite video is generated consisting of a first layer 302, a second layer 306, and a third layer 312. The video content depicting imagery of the first user can be seen in user image 308. The original backdrop of the video content has been removed, and the imagery of the first user remains. An image mask 304 of the first user shows a determined boundary around the outline of the first user, where the white section represents the interior portion of the boundary and the black section represents the exterior portion. After the system determines the boundary about the user, the system provides a media background for the exterior portion of the boundary. The media background may be a default media background, a media background selected by the user, or some other suitable media background. In this example, the media background is determined to be a default black background. The black media background is provided around an exterior portion of the image mask 304.

After the media background is received, the system generates a composite video for display on one or more client devices associated with the first user, one or more additional users, or a combination thereof. The composite video consists of a first layer 302, which contains the media background at the exterior portion of the boundary as well as the image mask 304 at the interior portion of the boundary; and a second layer 306, which contains the imagery of the user from the video content, with the backdrop of the video content removed. The resulting composite video appears to viewers such that the video depicting the user is overlaid on top of the media background, creating the appearance of the user being placed seamlessly in front of the media background.

As described above with respect to FIG. 2, steps 210 and 212, the system receives annotation inputs corresponding to the composite video, and then updates the composite video to additionally depict the annotation inputs within a third layer. The annotation inputs 304 are illustrated within a third layer 312. In some embodiments, while the first user can see a self-view mode on their client device as presenter during a video stream, the user can interact with an "Annotation" UI element, such as a button, menu or submenu item, or icon within a toolbar. Upon interacting with this UI element, the user is provided with a set of tools for annotating the video shown in self-view mode. The user may use a stylus or pen, or simply touch input with fingers to draw annotations directly on the screen. The user may also type text within text boxes which can appear on the screen, generate geometric objects, lines, and more, adjust characteristics of the stylus, pen, or touch input (e.g., input weight, color, and type of virtual writing implement), and otherwise provide annotation input in various ways.

The composite video updates in real time or substantially real time upon the annotation inputs being received, and the annotations appear within the third layer. The third layer appears overlaid on top of the second layer where the imagery of the first user is located. Thus, as illustrated, when viewers see the video, it appears to them as though the annotations are drawn in front of the user as the user speaks and moves around, with the media background seamlessly appearing behind the user.

Figure 4A:
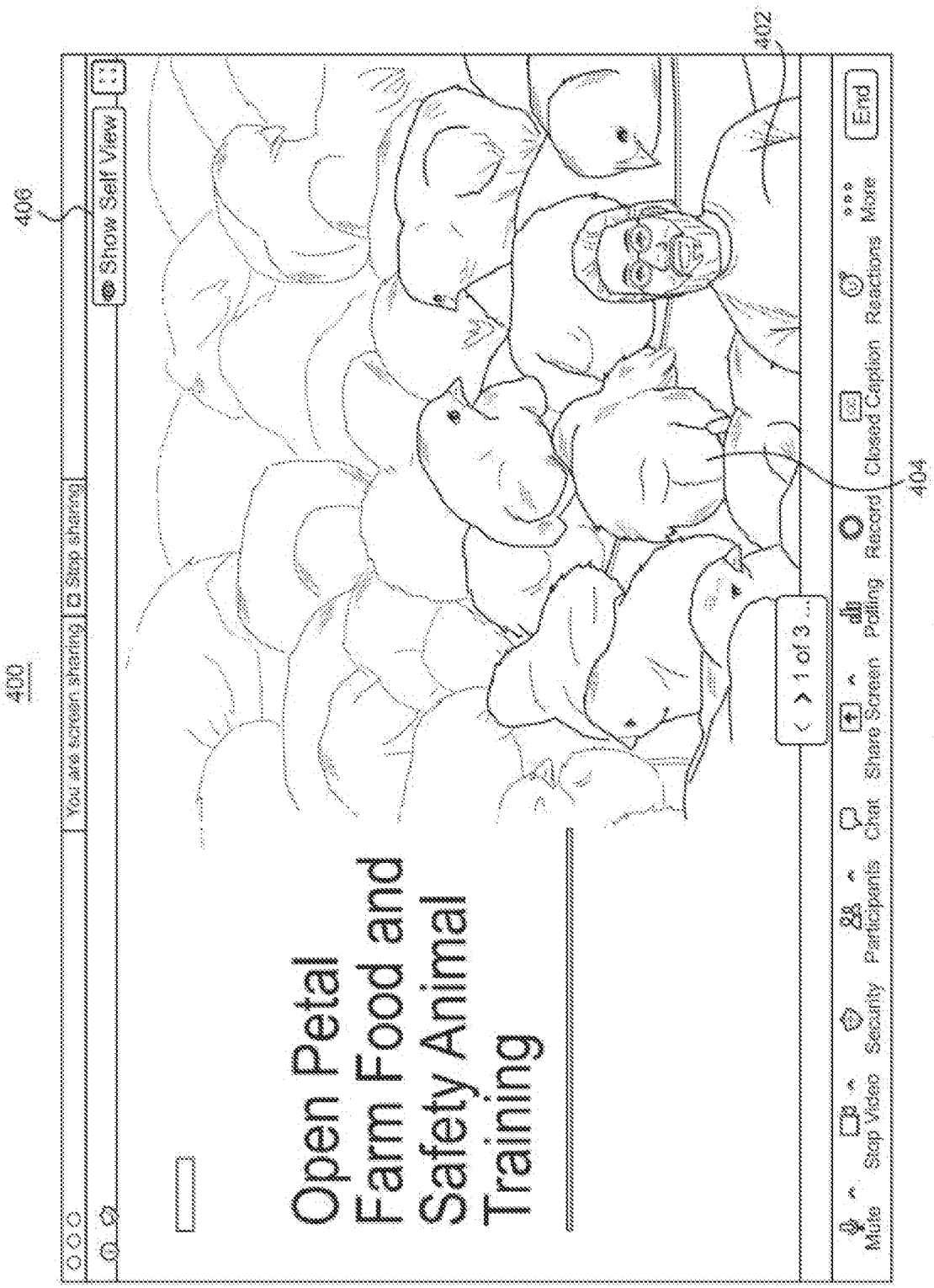
FIG. 4A is a diagram illustrating one example embodiment 400 of a presenter's video appearing overlaid on a media background, in accordance with some embodiments.

FIG. 4A is a diagram illustrating one example embodiment 400 of a presenter's video appearing overlaid on a media background, in accordance with some embodiments. Within the example embodiment 400, a presenter 402 is giving a live streaming presentation. Behind the video of the presenter 402 is a media background 404. The media background 404 is provided as a presentation consisting of a number of slides. The presentation slide was selected by the presenter from a local storage drive of the presenter's client device. The title slide is depicted in the example as the presenter speaks in front of the slide. The presenter can thus have the convenience of gesturing toward parts of the slide or otherwise presenting with the benefit of both the presenter and the slide being visible on one screen. The screen illustrated in the example embodiment is the screen visible to the presenter on the presenter's client device. The screen view is currently showing the view as it would be visible to viewers. A "Show Self View" UI element 406 allows the presenter to toggle instead to a self-view mode, where the screen depicts the user's image more closely or exclusively, with the media background either not being present, or not being fully visible.

In some embodiments, the first user (i.e., the presenter) appears overlaid on a sub portion of the media background within the composite video. This is illustrated in the example embodiment, as the presentation slide shown in the media background is much larger in size than the view of the user, which can only be seen in one corner of the media background. Thus, the media background need not be the same size or dimensions as the video content depicting the user. Rather, then media background can potentially be much larger, regardless of the size or dimensions of the media background, however, the user will still appear as though he is seamlessly standing in front of the media background.

Figure 4B:
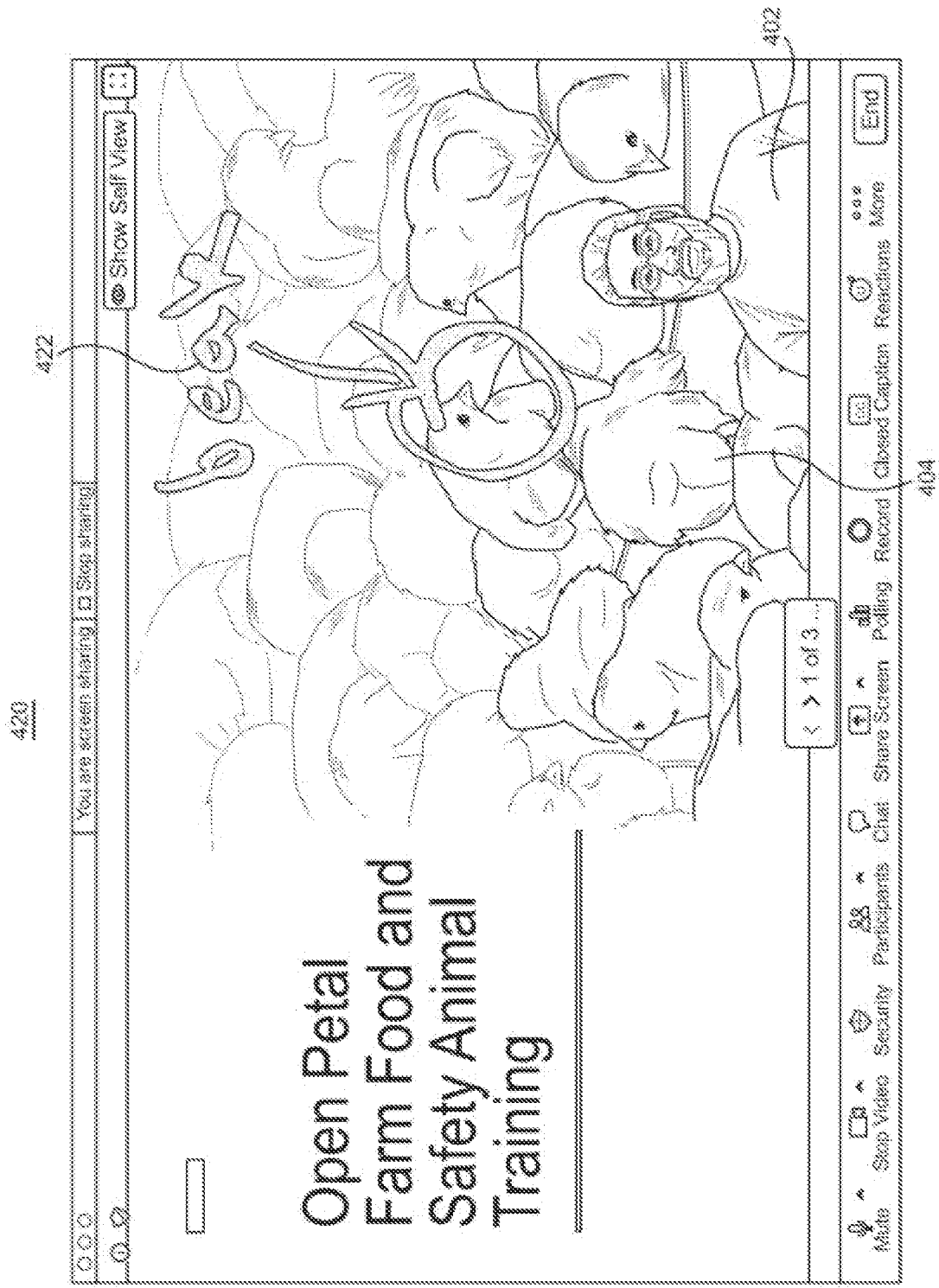
FIG. 4B is a diagram illustrating one example embodiment 420 of a presenter providing live annotations over a media background, in accordance with some embodiments.

FIG. 4B is a diagram illustrating one example embodiment 420 of a presenter 402 providing live annotations 422 over a media background 404, in accordance with some embodiments. The example embodiment 420 depicts the same live streaming presentation as the example embodiment 400 from FIG. 4A, with the presenter's image 402 appearing overlaid on top of the media background 404, which is a title slide of a presentation. The presenter has selected an annotation tool UI element within the interface presented, which allows the presenter to annotate the view presented to the viewers. In this example, the presenter has a smart pen which can be used in conjunction with a tablet as the client device. The presenter chooses an annotation color of white, and a medium weight to the annotations. The presenter has then provided annotation input with the pen on the client device, which is received by the system. The system then updates the composite video to include annotations 422 in the same location of the video as where the presenter provided the annotation inputs on the screen. As illustrated, the annotations ca n helpfully allow the presenter to circle a key portion of the presentation slide, draw a label and an arrow, and more. In this way, the presenter can directly annotate visible elements of the media background. In some embodiments, the annotations may appear in front of the presenter, as though the presenter is drawing directly on a transparent surface in front of him.

Figure 4C:
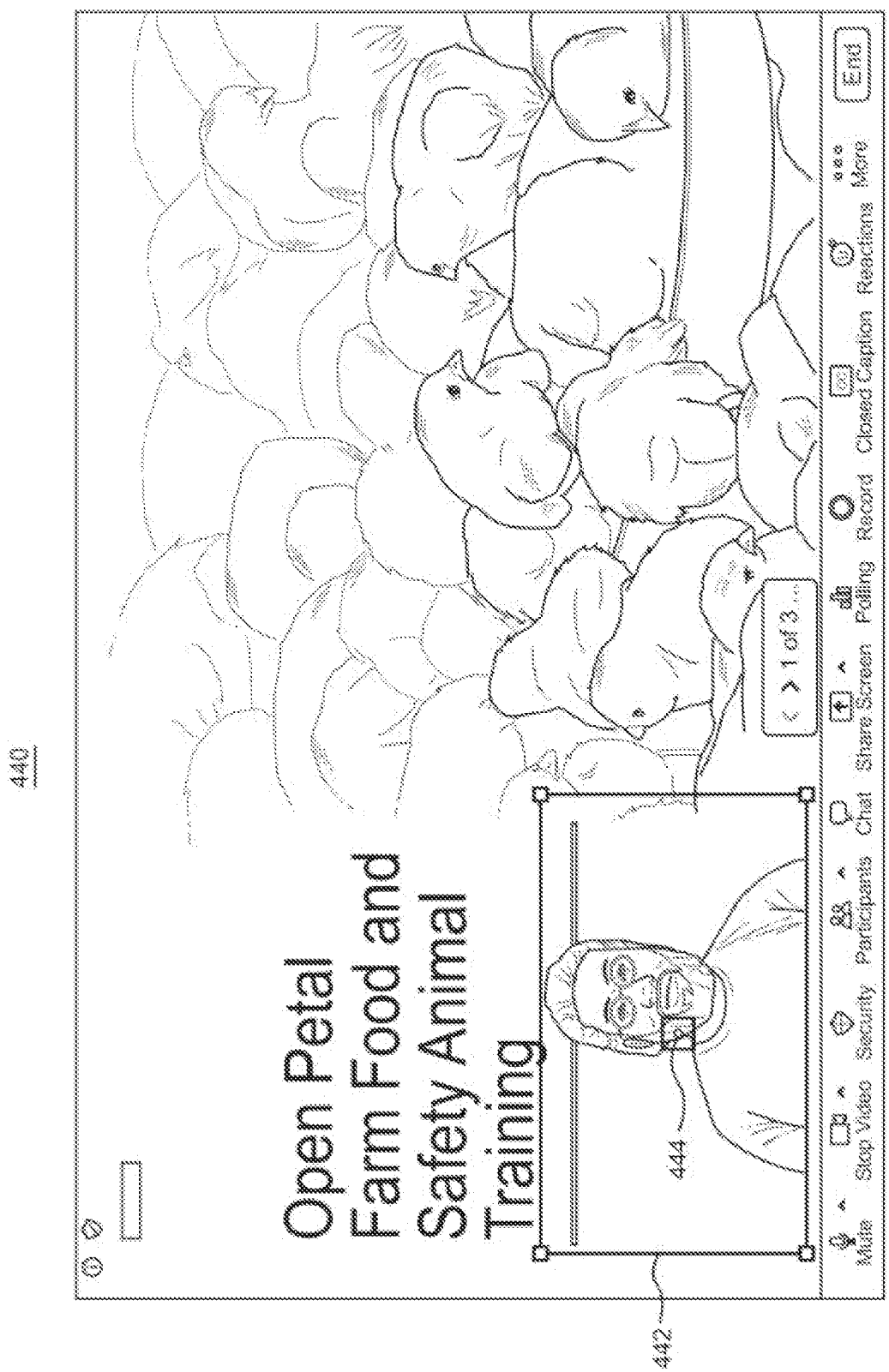
FIG. 4C is a diagram illustrating one example embodiment 440 of a presenter's video being repositioned over a media background, in accordance with some embodiments.

FIG. 4C is a diagram illustrating one example embodiment 440 of a presenter's video being repositioned over a media background, in accordance with some embodiments. The example embodiment 440 illustrates the same live streaming presentation scenario as FIG. 4A. After the composite video with the first and second layers is generated and served to the viewers, the presenter may see the result and decide that his image is located in a spot that inconveniently blocks a portion of the media background he is trying to present and make visible. To correct this, the presenter may be given the ability to interact with UI element(s) for adjusting a view window 442 of the presenter. The presenter can manipulate the window by interacting with it directly on the screen of the client device. For example, by clicking on himself, a border around the window is visible. The presenter can then hold and drag a section 444 of the window to reposition the window to a different location, such as on the left side, as illustrated. In some embodiments, the window can be repositioned in real time or substantially real time as the presenter repositions the window while presenting over the live stream.

Figure 4D:
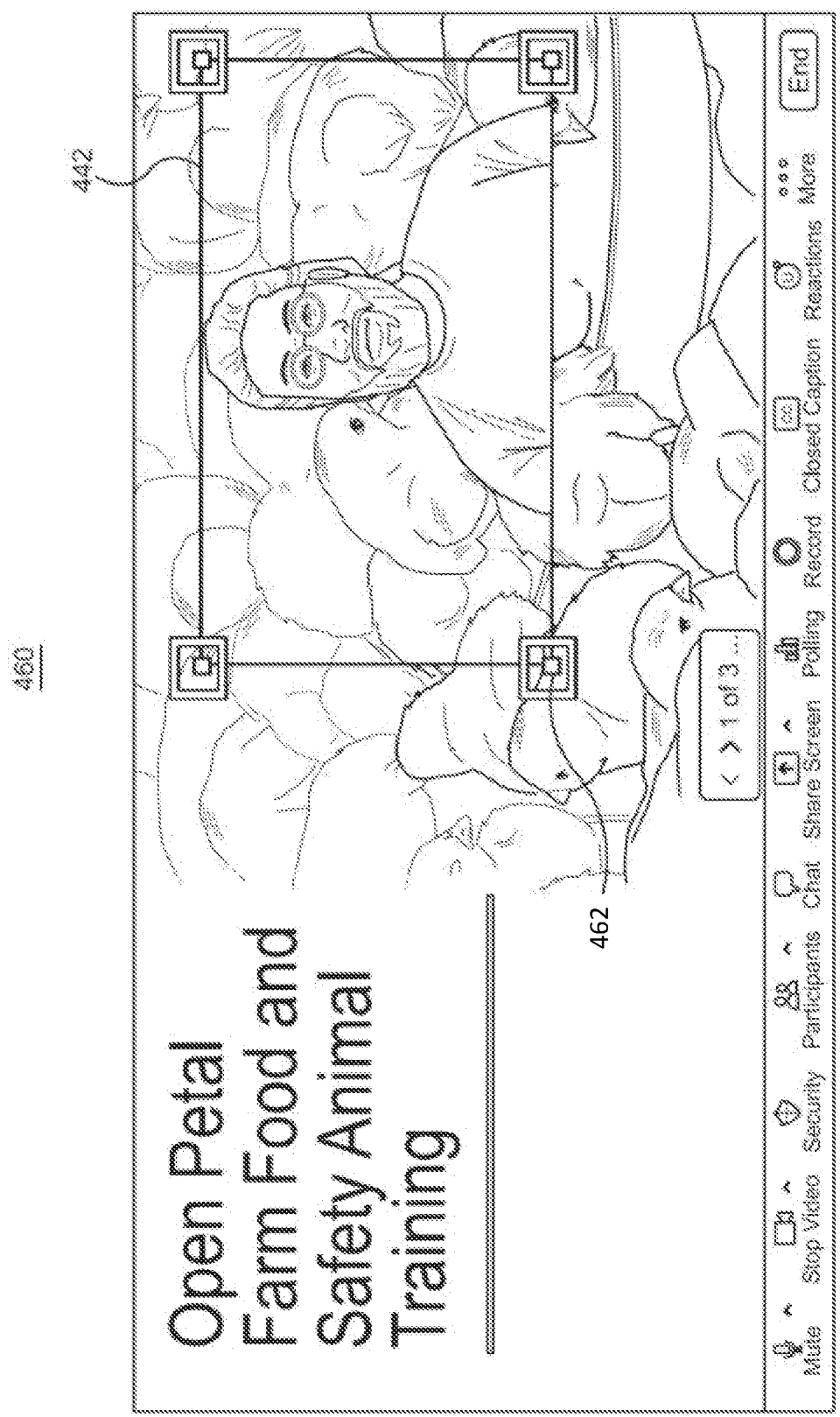
FIG. 4D is a diagram illustrating one example embodiment 460 of a presenter's video being resized over a media background, in accordance with some embodiments.

FIG. 4D is a diagram illustrating one example embodiment 460 of a presenter's video being resized over a media background, in accordance with some embodiments. The view window of the presenter is visible, as is the media background showing a title screen of a presentation. Upon clicking on the image of himself or otherwise interacting with it on the client device, the view window appears with visible border lines. The window also shows four corner window elements 462 which can be interacted with. The presenter can optionally hold and drag one of the four corners window elements 462 of the window to resize the window, thus making the presenter appear larger in the video as he presents in front of the media background and behind any annotations which are visible. The resizing of the window can be done in real time or substantially real time, such that the image of the presenter is resized in real time while the presenter is presenting over the live stream presentation.

Figure 5:
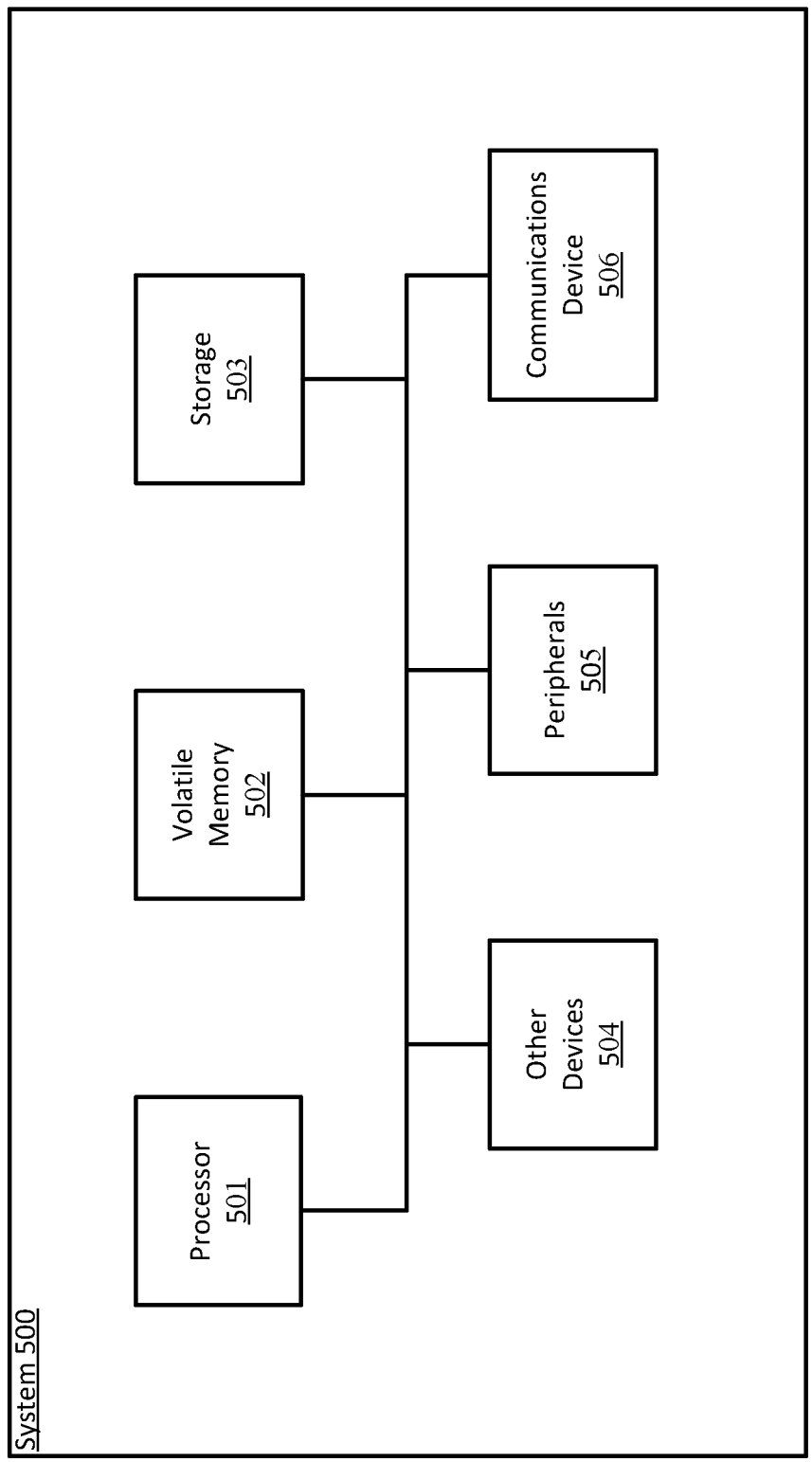
FIG. 5 is a diagram illustrating an exemplary computer that may perform processing in some embodiments.

FIG. 5 is a diagram illustrating an exemplary computer that may perform processing in some embodiments. Exemplary computer 500 may perform operations consistent with some embodiments. The architecture of computer 500 is exemplary. Computers can be implemented in a variety of other ways. A wide variety of computers can be used in accordance with the embodiments herein.

Processor 501 may perform computing functions such as running computer programs. The volatile memory 502 may provide temporary storage of data for the processor 501. RAM is one kind of volatile memory. Volatile memory typically requires power to maintain its stored information. Storage 503 provides computer storage for data, instructions, and/or arbitrary information. Non-volatile memory, which can preserve data even when not powered and including disks and flash memory, is an example of storage. Storage 503 may be organized as a file system, database, or in other ways. Data, instructions, and information may be loaded from storage 503 into volatile memory 502 for processing by the processor 501.

The computer 500 may include peripherals 505. Peripherals 505 may include input peripherals such as a keyboard, mouse, trackball, video camera, microphone, and other input devices. Peripherals 505 may also include output devices such as a display. Peripherals 505 may include removable media devices such as CD-R and DVD-R recorders/players. Communications device 506 may connect the computer 100 to an external medium. For example, communications device 506 may take the form of a network adapter that provides communications to a network. A computer 500 may also include a variety of other devices 504. The various components of the computer 500 may be connected by a connection medium such as a bus, crossbar, or network.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying" or "determining" or "executing" or "performing" or "collecting" or "creating" or "sending" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

Various general purpose systems may be used with programs in accordance with the teachings herein, or it may prove convenient to construct a more specialized apparatus to perform the method. The structure for a variety of these systems will appear as set forth in the description above. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. The disclosure and drawings are, accordingly, to be regarded in an illustrative sense rather than a restrictive sense.

What is claimed is:

1. A method, comprising:
    transmitting, for display at devices of users of a conference, a first composite video depicting a media background shared to the conference by a first user of the users and depicting the media background at least partially overlaid by images of the first user;
    receiving a presentation content from a device of a second user of the users, wherein the presentation content is associated with a document accessed by the device of the second user from a repository and the presentation content is streamed from the device of the second user;
    transmitting for display a second composite video depicting the media background partially overlaid by the presentation content and the images of the first user to at least a subset of the devices;
    assigning different subsets of the users to respective virtual breakout rooms;
    displaying the first composite video in each of the respective virtual breakout rooms;
    receiving another presentation content from another device of a user assigned to one of the respective virtual breakout rooms; and
    transmitting for display at respective devices of the users of only the one of the respective virtual breakout rooms a third composite video that includes the first composite video and the another presentation content.

2. The method of claim 1, further comprising:
    receiving a request from a device of the first user to grant an access right to the second user to share the presentation content for depiction within the second composite video.

3. The method of claim 1, wherein the images are obtained by a capture device connected to the conference.

4. The method of claim 1, wherein the media background and the presentation content are composited in a first layer of the second composite video, the method further comprising:
    receiving an annotation from a device of the first user; and
    updating the second composite video to additionally depict the annotation in a second layer that overlays the first layer.

5. The method of claim 1, wherein the media background and the presentation content are composited in a first layer of the second composite video, the method further comprising:

receiving an annotation from the device of the second user; and
updating the second composite video to additionally depict the annotation in a second layer that overlays the first layer.

6. The method of claim 1, wherein the second composite video comprises three layers, the method further comprising:
compositing the media background and the presentation content in a first layer;
compositing the images of the first user in a second layer that overlays the first layer; and
compositing annotations received from at least one device of the devices in a third layer that overlays the second layer.

7. The method of claim 1, further comprising:
configuring each of the respective virtual breakout rooms to play back the media background in synchronization with at least some others of the respective virtual breakout rooms.

8. The method of claim 1, further comprising:
simultaneously displaying respective views of more than one of the respective virtual breakout rooms at a device of the first user.

9. A system, comprising:
a memory; and
a processor, the processor configured to execute instructions stored in the memory to:
transmit for display at devices of users of a conference a first composite video depicting a media background shared by a first user of the users and depicting the media background at least partially overlaid by images of the first user;
receive a presentation content from a device of a second user of the users, wherein the presentation content is associated with a document accessed by the device of the second user from a repository and the presentation content is streamed from the device of the second user;
transmit for display a second composite video depicting the media background partially overlaid by the presentation content and the images of the first user to at least a subset of the devices;
assign different subsets of the users to respective virtual breakout rooms;
display the first composite video in each of the respective virtual breakout rooms;
receive another presentation content from another device of a user assigned to one of the respective virtual breakout rooms; and
transmit for display at respective devices of the users of only the one of the respective virtual breakout rooms a third composite video that includes the first composite video and the another presentation content.

10. The system of claim 9, wherein the media background is displayed in an inner-most first layer of the first composite video and a stream of the images of the first user obtained via a device associated with the first user is displayed in a second layer that is overlaid over the inner-most first layer.

11. The system of claim 9, wherein the processor is further configured to execute instructions to:
receive a request from a device of the first user to grant an access right to the second user to annotate the second composite video; and
receive an annotation from the device of the second user.

12. The system of claim 9, wherein the processor is further configured to execute instructions to:
receive a command from a device of the first user to display the images of the first in the first composite video.

13. The system of claim 9, wherein the second composite video comprises respective images of at least two users overlaid on the media background, and wherein the respective images are obtained in real time via respective devices of the at least two users.

14. A non-transitory computer readable medium storing instructions operable to cause one or more processors to perform operations comprising:
transmitting for display at devices of users of a conference a first composite video depicting a media background shared to the conference by a first user of the users and depicting the media background at least partially overlaid by images of the first user;
receiving a presentation content from a device of a second user of the users, wherein the presentation content is associated with a document accessed by the device of the second user from a repository and the presentation content is streamed from the device of the second user;
transmitting for display a second composite video depicting the media background partially overlaid by the presentation content and the images of the first user to at least a subset of the devices;
assigning different subsets of the users to respective virtual breakout rooms;
displaying the first composite video in each of the respective virtual breakout rooms;
receiving another presentation content from another device of a user assigned to one of the respective virtual breakout rooms; and
transmitting for display at respective devices of the users of only the one of the respective virtual breakout rooms a third composite video that includes the first composite video and the another presentation content.

15. The non-transitory computer readable medium of claim 14, wherein the operations further comprise:
receiving a command from a device of the first user to display the images of the first user;
receiving the images of the first user; and
compositing the images into the second composite video overlaid over the media background.

16. The non-transitory computer readable medium of claim 14, wherein the operations further comprise:
simultaneously displaying respective views of more than one of the respective virtual breakout rooms at a device of the first user.

17. The non-transitory computer readable medium of claim 14, wherein the operations further comprise:
receiving an annotation from a device of the first user; and
including the annotation in the first composite video overlaid over a layer of the first composite video that includes the presentation content.

18. The non-transitory computer readable medium of claim 14, wherein the operations further comprise:
receiving an annotation from a device of one of the users; and
including the annotation in the second composite video overlaid over a layer of the second composite video that includes the presentation content.

19. The non-transitory computer readable medium of claim 14, wherein the first user is provided with an ability to switch a view on a device of the first user to any one of composite videos from subgroups or any combination of a plurality of the composite videos from the subgroups.

20. The non-transitory computer readable medium of claim 14, wherein the media background is composited in a first layer of the first composite video, a stream of the images of a user of the users is composited in a second layer that is overlaid over the first layer, and an annotation is composited in a third layer that is overlaid over the second layer.

* * * * *